United States Patent
Kim et al.

(10) Patent No.: US 8,826,301 B2
(45) Date of Patent: Sep. 2, 2014

(54) METHOD AND SYSTEM FOR PROCESSING DATA FOR PREVENTING DEADLOCK

(75) Inventors: Sangkyun Kim, Seoul (KR); Changhan Kim, Seoul (KR)

(73) Assignee: Ginno Games Inc. (KR)

( * ) Notice: Subject to any disclaimer, the term of this patent is extended or adjusted under 35 U.S.C. 154(b) by 191 days.

(21) Appl. No.: 13/505,170

(22) PCT Filed: Oct. 29, 2010

(86) PCT No.: PCT/KR2010/007517
§ 371 (c)(1),
(2), (4) Date: Apr. 30, 2012

(87) PCT Pub. No.: WO2011/053038
PCT Pub. Date: May 5, 2011

(65) Prior Publication Data
US 2012/0216215 A1    Aug. 23, 2012

(30) Foreign Application Priority Data

Oct. 30, 2009  (KR) .................. 10-2009-0104500

(51) Int. Cl.
| *G06F 9/54* | (2006.01) |
| *G06F 9/38* | (2006.01) |
| *G06F 9/06* | (2006.01) |
| *G06F 9/46* | (2006.01) |

(52) U.S. Cl.
CPC ... *G06F 9/06* (2013.01); *G06F 9/38* (2013.01)
USPC .......................................... 719/313; 718/100

(58) Field of Classification Search
CPC .................................. G06F 9/546; G06F 9/54
See application file for complete search history.

(56) References Cited

U.S. PATENT DOCUMENTS

| 5,828,881 | A | * | 10/1998 | Wang ........................ 719/314 |
| 7,290,086 | B2 | * | 10/2007 | Beardsley et al. .......... 711/114 |
| 7,644,197 | B1 | * | 1/2010 | Waldorf et al. ............. 710/21 |
| 2002/0174218 | A1 | | 11/2002 | Dick et al. |
| 2008/0163215 | A1 | * | 7/2008 | Jiang et al. ................. 718/100 |
| 2008/0271050 | A1 | * | 10/2008 | Fountoukas ................ 719/314 |
| 2008/0300838 | A1 | * | 12/2008 | Drumm et al. .............. 703/6 |

FOREIGN PATENT DOCUMENTS

| JP | 11-224204 | 8/1999 |
| JP | 2008-146674 | 6/2008 |
| KR | 10-2009-0071563 | 7/2009 |
| WO | 2008/038195 | 4/2008 |

OTHER PUBLICATIONS

International Search Report—PCT/KR2010/007517 dated Jun. 24, 2011.

* cited by examiner

*Primary Examiner* — Andy Ho
*Assistant Examiner* — Abdou Seye
(74) *Attorney, Agent, or Firm* — Cantor Colburn LLP (57) ABSTRACT

Provided are a method and system for processing data for preventing deadlock, and more particularly, provided are a method and system which process messages received at a message response standby state in an actor system so as to prevent deadlock. The data-processing method for preventing deadlock includes the following steps: (a) transmitting a read message for requesting information on the status of a target actor required for processing data; (b) receiving only read messages for reading information on the status of an actor until a response to the read message is received; and (c) when the response to the read message is received, processing relevant data using the status information.

5 Claims, 6 Drawing Sheets

METHOD AND SYSTEM FOR PROCESSING
DATA FOR PREVENTING DEADLOCK

TECHNICAL FIELD

The present invention relates to a method and system for processing data that prevents deadlock, and more particularly, to a method and system for processing data that prevents deadlock, in which an actor system processes a message that is received in the state in which the actor system is waiting for a response, thereby preventing deadlock.

BACKGROUND ART

In response to the development of multi-core central processing unit (CPU) technologies, the use of processors in which several CPU cores are mounted in one chip is increasing. As a scheme for maintaining the coherence of data that is processed across several CPUs, the functionality of protection for a critical section using multithreading, locking, and the like is provided at the level of the operating system (OS). However, with only this scheme, many difficulties occur and high expenses are incurred when developing and maintaining massive systems.

In addition, there is a method in which a distributed system performs interaction between objects using only a message for the purpose of concurrent execution. However, this method may result in a performance degradation due to the overhead of delivering the message, and may result in deadlock while waiting for a response to the transmitted message.

In the related art, a method for concurrent computation in a distributed system or a multithreaded system involves an actor system. The actor system is a system that is regarded as a basic element of concurrent computation.

An actor can receive and process a message, perform computation and make a decision by itself, create another actor, or transmit a message to another actor.

In the actor system, each actor has its states, i.e. data, and its own processing units for processing the data, e.g., threads. Each actor interacts with other actors while asynchronously exchanging messages with other actors.

The actor can execute operations on a received message, including 1) changing its own state (data), 2) transmitting the message to another actor, 3) creating a new actor, or 4) moving to another host.

The actor system may use synchronous messaging. Synchronous messaging is a messaging scheme in which, after a response to the message that was transmitted has been received, the subsequent operation based on the response is processed.

Synchronous messaging is a scheme that is widely used in server/client systems, including distributed systems. All direct calls in a common application system may be considered synchronous messages.

When such synchronous messages are generally allowed without restrictions, a deadlock may occur, in which two actors wait for a long time while requesting a response to their own read message from each other, without executing other processes. In this deadlock situation, a serious problem in which the entire system stops may occur.

Figure 1:
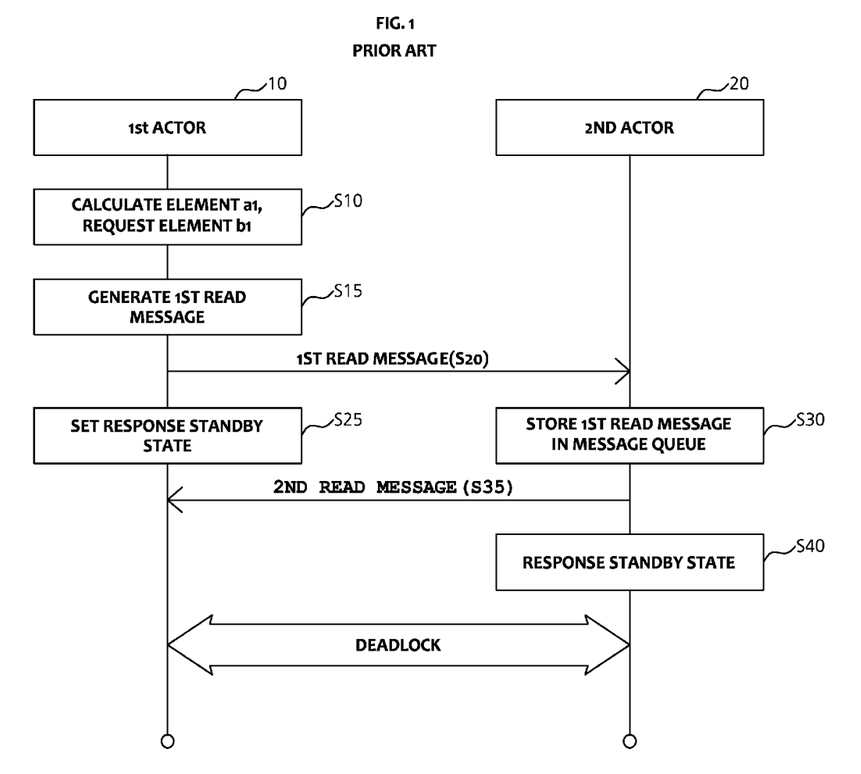
FIG. 1 is a signal flow diagram depicting a method for processing data by transmitting and receiving synchronous messages in an actor system of the related art.

FIG. 1 is a signal flow diagram depicting a method for processing data by transmitting and receiving synchronous messages in an actor system of the related art.

At step S10, a first actor 10 calculates an element a1 for data processing, and requests another element b1, which is required for the data processing. At step S15, the first actor 10 searches for a second actor 20, from which the first actor 10 will request the element b1, and generates a first read message, with which the element b1 will be requested from the second actor 20. The first read message generated by the first actor 10 is a synchronous message, with which, after a response to the message that is transmitted has been received, the subsequent procedure based on the response is processed.

At step S20, the first actor 10 transmits the first read message to the second actor 20.

At step S25, the first actor 10 sets a response standby state corresponding to the transmission of the first read message to the second actor 20. Since the read message is a synchronous message, the first actor 10 can execute subsequent procedures after receiving a response to the first read message from the second actor 20.

Therefore, the first actor 10 sets the state thereof to the response standby state until it receives the response to the first message that was transmitted to the second actor 20.

At step S30, the second actor 20 stores the first read message received from the first actor 10 in a message queue.

At step S35, the second actor 20 transmits a second read message to the first actor 10 in order to acquire information on the state of the first actor 10. Here, the second read message is a message that is not relevant to the first read message.

At step S40, the second actor 20 sets a response standby state corresponding to the transmission of the second read message to the first actor 10. The second actor 20 can execute subsequent procedures after receiving a response to the second read message from the first actor 10.

Therefore, the first actor 10 and the second actor 20 are set to the standby state until they have received respective responses from each other, and thus cannot process other messages.

Consequently, the first actor 10 cannot transmit the response to the second read message to the second actor 20, and the second actor 20 cannot transmit the response to the first read message to the first actor 10.

As a result, the first and second actors 10 and 20 wait indefinitely, and thus a deadlock occurs between the first and second actors 10 and 20.

As described above, the actor system of the related art has the problem in that a deadlock occurs due to the response standby state following the transmission of a synchronous read message.

DISCLOSURE

Technical Problem

In an embodiment of the invention, a predetermined message can be processed until a response to a read message is received when synchronous messages are transmitted and received between actors in order to prevent a deadlock, which would otherwise occur due to the actors waiting for a long time for responses to synchronous messages.

In an embodiment of the invention, when actors are present in the same memory space, an actor can read information on the state of a target actor via a direct-call scheme, thereby increasing the data processing rate and performance.

Technical Solution

As technical means for realizing the foregoing object, in a first aspect of the invention, provided is a method for processing data that prevents deadlock. The method includes the steps of: (a) transmitting a read message for requesting information on the state of a target actor required for processing data; (b) until a response to the read message is received, receiving and processing only a read message from which information on the state of an actor is read; and (c) when the response to the read message is received, processing relevant data using the information on the state of the target actor.

In the first aspect of the invention, the method may further include the steps of: (d) determining whether or not the target actor the information on the state of which is required is present in a same memory space; (e) when the target actor is present in the same memory space, reading the information on the state directly from the target actor; and (f) processing relevant data using the information on the state which is read directly.

In addition, in the first aspect of the invention, the read message that is processed in the step (b) may be received from a message queue. The message queue may store an event message, with which the state of the actor is changed, or a read message In a second aspect of the invention, provided is a system for processing data. The system includes a data processor, which processes data using information on the state of a target actor; a read message generator, which generates a read message for requesting the information on the state of the target actor from the target actor; and a received message processor, which processes only a read message for reading information on the state of an actor, among messages that are received until a response to the read message that is transmitted to the target actor is received.

Advantageous Effects

According to the technical means for realizing the foregoing object of the invention, it is possible to transmit a read message, i.e. a synchronous message, and before a response to the synchronous read message is received, process a read message received from another actor. Accordingly, when the response to the synchronous read message is being waited for, it is possible to dispatch and process the read message received from another actor from the message queue or the like instead of setting the received read message to a standby state, thereby preventing deadlock.

In addition, according to the technical means for realizing the foregoing object of the invention, it is possible to determine whether or not a target actor the information on the state of which is required is present in the same memory space, and when the target actor is present in the same memory space, acquire the information on the state of the target actor via a direct-call scheme in which the information on the state is acquired directly from the target actor instead of a scheme in which the information on the state is acquired using a message, thereby increasing the data processing rate and performance.

BEST MODE

Reference will now be made in detail to various embodiments of the present invention in conjunction with the accompanying drawings, so that a person having ordinary skill in the art to which the present invention relates can easily put the present invention into practice. The present invention is not limited to specific embodiments, which will be described hereinafter, but can be embodied in various different forms. In the drawings, those parts that are not essential to the description are omitted when they may make the present invention unclear. Throughout this document, reference should be made to the drawings, in which the same reference numerals and signs are used throughout the drawings to designate the same or similar components.

Throughout the specification, it will be understood that when a part is referred to as being "connected to" any other part, it not only can be "directly connected to" the other part, but also can be "electrically connected to" the other part via an intervening part. Unless explicitly described to the contrary, it will be understood that when a part is referred to as "comprising or including" some elements, it may imply the inclusion of any other elements but not the exclusion of the other elements.

Figure 2:
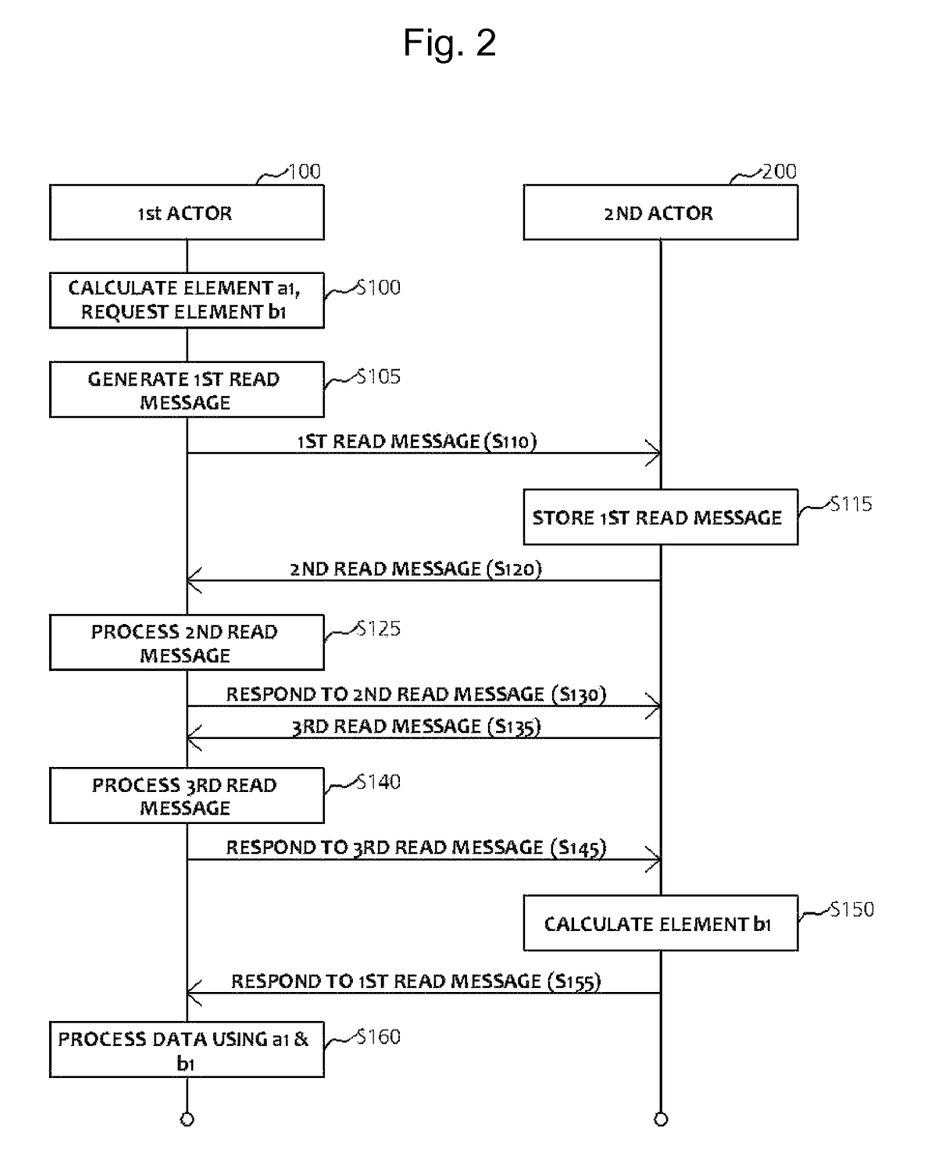
FIG. 2 is a signal flow diagram depicting a method for processing data according to an embodiment of the invention.
Figure 3:
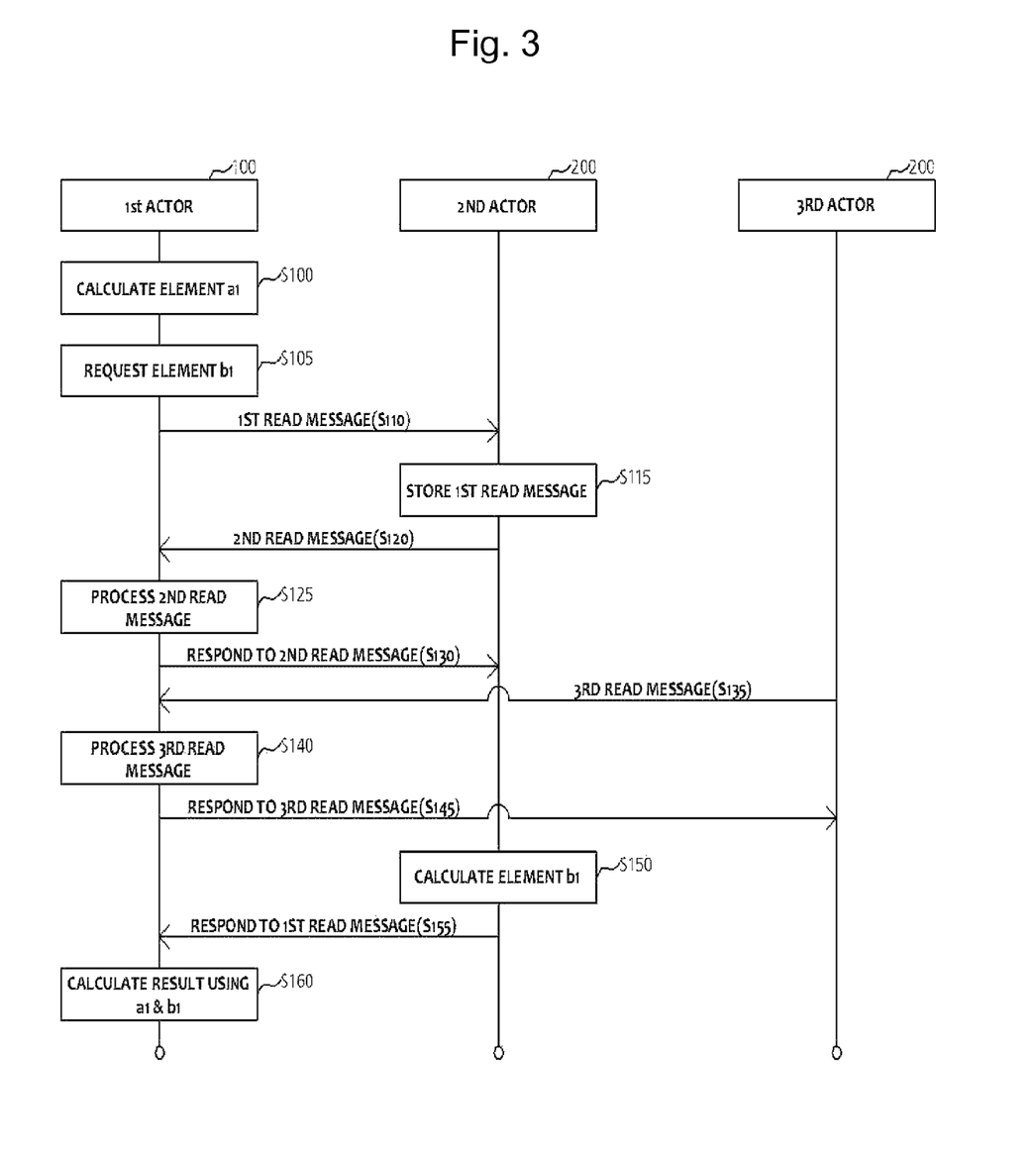
FIG. 3 is another signal flow diagram depicting the method for processing data according to an embodiment of the invention.

FIG. 2 and FIG. 3 are signal flow diagrams depicting the sequence of a method for processing data according to an embodiment of the invention.

At step S100, a first actor 100 calculates a1 as an element required for data processing, and requests b1 as another element required for data processing. Here, b1 is an element that must be received from an actor other than the first actor, and may include therein information on the state of the actor.

At step S105, the first actor 100 generates a first read message that is required for requesting b1 from a second actor 200. The first read message generated by the first actor 100 is a synchronous message, with which, after a response to the message that is transmitted has been received, the subsequent procedure based on the response is processed.

Synchronous messaging is a scheme that is widely used in server/client systems, including distributed systems. All direct calls in a common application system may be considered synchronous messages.

At step S110, the first actor 100 transmits the first read message to the second actor 200. The first read message can be transmitted from the first actor 100 to the second actor 200 by a message processor.

The message processor acquires a message from a message queue, delivers the message to a corresponding actor, and executes the content of the message. In general, the message processor may be a thread provided by the operating system (OS), and be present in each actor.

The thread can be processed by each core of different central processing units (CPUs) in one host, or be distributed to different hosts. In the description of an embodiment of the invention, it is assumed that each actor include one independent message processor.

At step S115, the second actor 200 stores the first read message received from the first actor 100 in a message queue.

The message queue is a queue of messages, which are waiting to be executed. One host may have a single message queue, or each actor may have a message queue. In an embodiment of the invention, it is assumed that each actor has a message queue for the sake of understanding.

At step S120, the second actor 200 transmits a second read message to the first actor 100.

At step S125, the first actor 100 processes the second read message received from the second actor 200. In an embodiment of the invention, the actor 100 is not set to a response standby state when the read message was transmitted to the second actor 200, unlike the related art.

Therefore, the first actor 100 can process the second read message when a response to the first read message is not received from the second actor 200.

At step S130, the first actor 100 transmits a response to the second read message, which includes the result of processing at step S125, to the second actor 200.

At step S135, the second actor 200 or a third actor 200 transmits a third read message to the first actor 100. At step S140, the first actor 100 processes the (second) third (error in PCT application) read message received from the second actor 200 or the third actor 200. At step S145, the first actor 100 transmits a response to the third read message, which includes the result of processing at step S140, to the second actor 200 or the third actor 200.

In an embodiment of the invention, in this way, the first actor 100 is not set to the response standby state even after it transmitted the first read message to the second actor 200. Therefore, the first actor 100 can process the read message received from at least one other actor and send a response to that actor.

At step S150, the second actor 200 calculates the element b1, which is information on the state of the second actor 200 requested by the first actor 100, by analyzing the first read message.

At step S155, the second actor 200 transmits a response to the first read message to the first actor 100. The response to the first read message transmitted from the second actor 200 includes information b1 on the state of the second actor 200, which was calculated at step S150.

At step S160, the first actor 100 processes data using the element a1, which was calculated at step S100, and the element b1, which is included in the first read message received from the second actor 200.

Figure 4:
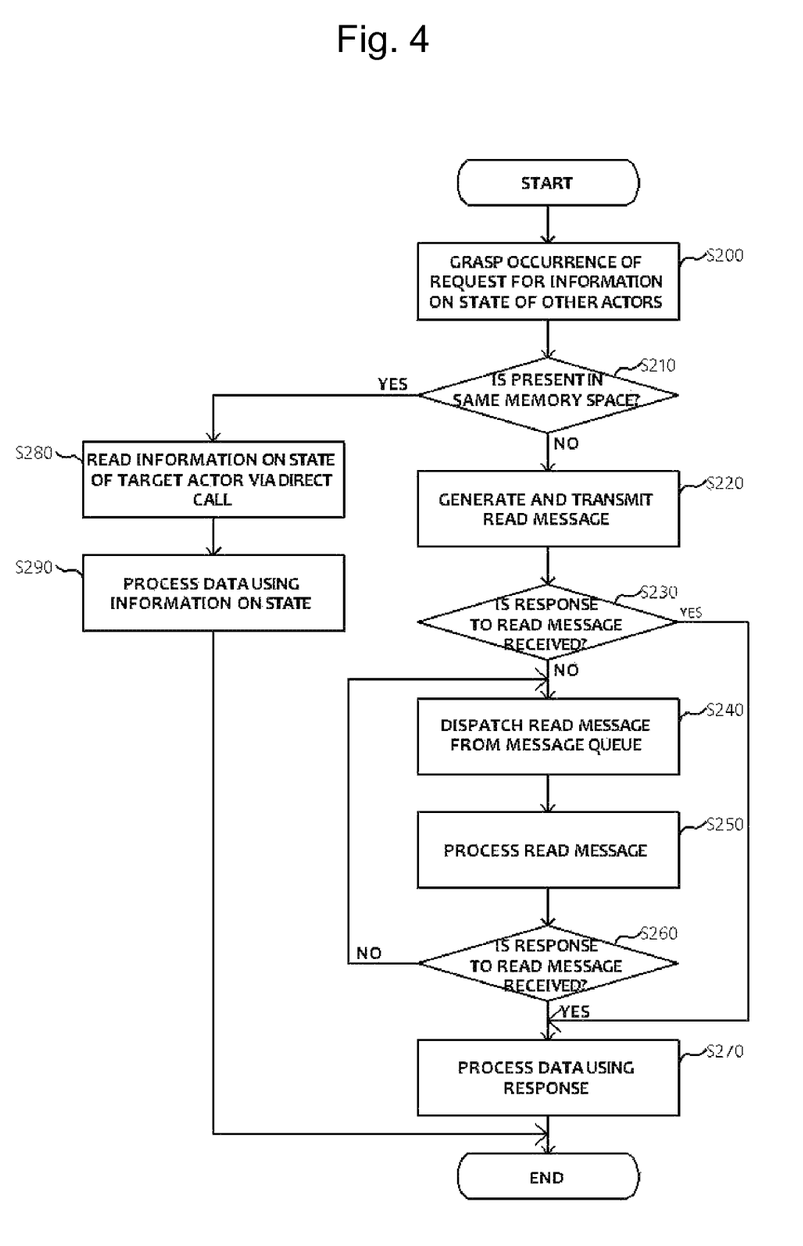
FIG. 4 is a flowchart depicting the message-processing sequence of an actor in the method for processing data according to an embodiment of the invention.

FIG. 4 is a flowchart depicting the message-processing sequence of an actor in the method for processing data according to an embodiment of the invention.

At step S200, one actor perceives the occurrence of a situation in which information on the state of another actor, i.e. a target actor, is requested. That is, the actor perceives that information on the state of another actor is required in the process of processing data.

At step S210, it is determined whether or not the target actor, which is the target of the information on the state that is required, is present in the same memory space.

At step S220, when it is determined that the target actor is not present in the same memory space at step S210, a read message, with which the information on the state of the target actor can be read for the purpose of processing data is generated, and the read message is transmitted to the target actor.

The message that is generated and transmitted/received by the actor includes therein an event message or an event message. The event message is an asynchronous message, with which the state of an actor, which receives this message, can be changed, whereas the read message is a synchronous message, with which the state of an actor, which receives this message, is read only. Therefore, in order to read the information on the state of the target actor, the read message is generated and transmitted to the target actor.

The read message can be transmitted by the message processor. A thread provided by the operating system (OS) may act as the message processor.

At step S230, it is determined whether or not a response to the read message that was transmitted at step S220 has been received. The read message is a synchronous message, with which, after a response to the message has been identified, the procedure based on the response is processed. Therefore, it is possible to determine whether or not to perform the procedure subsequent to the reception of the response by determining whether or not the response to the read message that was transmitted has been received.

At step S240, when it is determined that the response is not received at step S230, a read message stored in the message queue is dispatched from the message queue.

When a message that is received cannot be immediately processed by the actor, the message queue stores the received message and sets the received message to a standby state until the received message is processed by the actor. In sometime the actor can immediately process the received message, but in other time the actor must set the received message to the standby state in order to perform different processing depending on the situation.

In this case, the actor can set the received message to the standby state by storing the received message in the message queue, and afterwards, process the received message by dispatching it from the message queue at a time point when the received message can be processed.

At step S250, the read message that was dispatched at step S240 is analyzed and processed. That is, a response is transmitted to a corresponding actor by analyzing the read message, and performing the processing based on the analyzed read message.

In this way, in an embodiment of the invention, the actor can process some read message received from other actors during a response standby time, from the transmission of the read message to the reception of the response, unlike the related art.

In this case, when the state of the actor is changed due to the processing of another message before data processing is performed based on the response to the transmitted read message, the state of the actor when transmitting the read message and the state of the actor when receiving the response may differ from each other. Thus, when data is processed based on the response to the transmitted read message, a problem may occur.

As described above, although the message queue may include not only read messages, i.e. synchronous messages, but also event messages, i.e. asynchronous messages, the messages that can be processed while the response to the transmitted read message is being waited for are limited to the synchronous messages, i.e. read messages.

At step S260, it is determined whether or not a response to the read message that was transmitted at step S220 has been received.

At step S270, when the response to the read message that was transmitted at step S220 has been received, data is processed using the information on the state of the target actor, which is included in the received response.

At step S280, when it was determined that the target actor is present in the same memory space at step S210, the information on the state of the target actor is read via a direct-call scheme.

At step S290, relevant data is processed using the information on the state that was read at step S280. This method of reading the information on the state of the target actor via the direct-call scheme can increase the data processing rate and the performance of the system compared to the method of using the synchronous message in which a response must be waited for after the message was transmitted.

Figure 5:
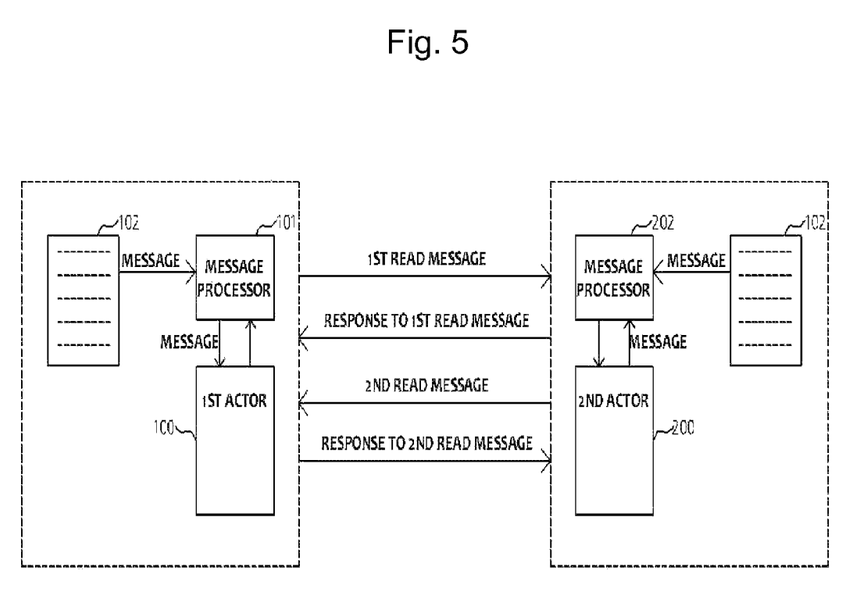
FIG. 5 is a diagram depicting the construction of a system for processing data according to an embodiment of the invention.

FIG. 5 is a diagram depicting the construction of a system for processing data according to an embodiment of the invention.

As described above, in an embodiment of the invention, each actor 100, 200 includes a message processor 101, 201 and a message queue 102, 202.

When information on the state of the second actor 200 is determined to be required for data processing, the first actor 100 generates a first read message required for reading the information on the state of the second actor 200 and transmits the generated first read message to the second actor 200.

The first actor 100 receives a read message and an event message from the second actor 200 or other actors, and when the received message cannot be immediately processed, stores the received message in the message queue 102 via the message processor 101.

The first actor 100 sequentially dispatches messages stored in the message queue 102 using the message processor 101, and performs procedures depending on the type and content of the messages.

For example, when a read message is dispatched, the first actor 100 generates a response that includes information on the state of the first actor, which is requested by the read message, and transmits the generated response to the actor that transmitted the read message. When an event message is dispatched, the first actor 100 changes the state of the first actor 100 based on information included in the event message.

The first actor 100 acquires information on the state of the second actor 200 by receiving a response to the first read message from the second actor 200, and processes data using the received information on the state.

In the system for processing data according to an embodiment of the invention as described above, the actor can process the received read message even though the response to the read message that was transmitted to the target actor has not been received, thereby preventing deadlock which would otherwise occur due to delay in the processing of the read message.

Figure 6:
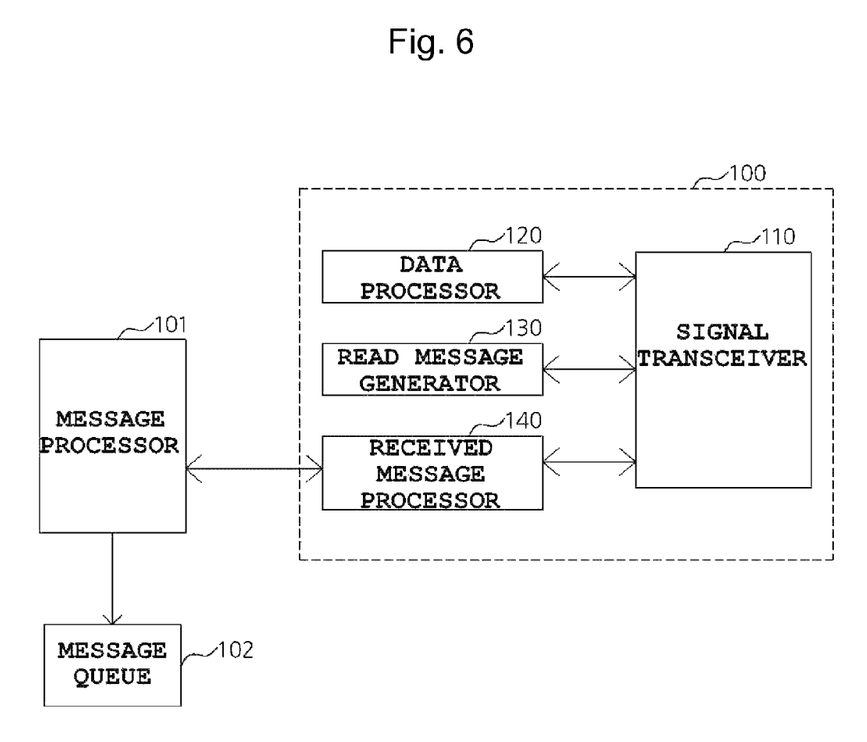
FIG. 6 is a diagram depicting the construction of the actor of the system for processing data according to an embodiment of the invention.

FIG. 6 is a diagram depicting the construction of the actor of the system for processing data according to an embodiment of the invention The actor 100 according to an embodiment of the invention includes a signal transceiver 110, a data processor 120, a read message generator 130 and a received message processor 140.

The signal transceiver 110 transmits a signal, such as a message, to other actors, and receives a signal.

That is, the signal transceiver 110 receives a message, such as a read message or an event message, and transmits a signal, including a response to the received read message, to a corresponding actor. In addition, the signal transceiver 110 transmits a read message to the target actor, and receives a response to that read message.

When information on the state of the target actor is required for data processing, the data processor 120 determines whether or not the corresponding actor is present in the same memory space as the actor 100. When the corresponding actor is not present in the same memory space, the data processor 120 requests the read message generator 130 to generate a read message that is to be transmitted to the corresponding actor.

When a transmission situation notifying that the read message was transmitted to the corresponding actor is received from the data processor 130, the data processor 120 requests the received message processor 140 to process only read messages and stop processing event messages until a response from the corresponding actor is received.

As described above, when the state of the actor is changed by processing another message before a response to the read message that was transmitted is received and data processing based on the response is performed, a problem may occur in the data processing based on the response to the transmitted read message. Therefore, the data processor 120 requests the received message processor 140 to process only a read message, with which the state of the actor is not changed.

When it is determined that the corresponding actor is present in the same memory space as the actor 100, the data processor 120 reads the information on the state of the corresponding actor via a direct-call scheme.

The data processor 120 receives the response to the read message that was transmitted from the corresponding actor, and performs data processing using the information on the state included in the received response.

The read message generator 130 generates a read message to be transmitted in response to the request from the data processor 120. When the read message is generated using information of an actor that is intended to receive the read message, the information of the actor being included in the request from the data processor 120, the read message generator 130 transmits the read message via the signal transceiver 110, and informs the situation of the transmission to the data processor 120.

The received message processor 140 processes a message, which is stored in the message queue 102, by dispatching the message. When requested from the data processor 120, the received message processor 140 stops processing the event message and processes only the read message by dispatching it.

That is, the received message processor 140 processes messages, limited to read messages, until a response to the read message that the actor 100 transmitted to the target actor is received.

In this way, before the response to the read message that was transmitted to the target actor is received, the received message processor 140 can process the received read messages, thereby preventing a situation in which messages would otherwise excessively stand by in the message queue 102.

The foregoing embodiment of the invention can be applied to a distributed environment in which a plurality of hosts is provided, as well as an environment in which one or more CPU cores, so-called multiple cores, are provided in one host.

That is, the invention can be applied to a situation in which actors are present in respective hosts, as well as a situation in which actors are present in the same host.

An embodiment of the invention can be embodied in the form of a record medium that contains therein computer executable instructions, such as a program module that is executed by computers. The computer executable record medium can be any available medium that can be accessed by computers, and includes all of volatile and nonvolatile media and separated and unseparated media.

In addition, the computer executable record medium may include all of computer storage media and communication media. The computer storage media include all of volatile, nonvolatile, separated and unseparated media, which are realized by any methods or technologies for storing information, such as computer readable instructions, data structures, program modules or other data. Typically, the communication media include computer readable instructions, data structures, program modules, other data of modulated data signals such as carrier waves, or other transmission mechanisms, and include any information transfer media.

Although the method and system of the invention have been described in connection with specific embodiments of the invention, some or all of the components or operations thereof may be realized using a computer system that has hardware architecture for general-use.

The foregoing description of the invention is for illustrative purposes, a person having ordinary skilled in the art will appreciate that other specific modifications can be easily made without departing from the technical spirit or essential features of the invention. Therefore, the foregoing embodiments should be regarded as illustrative rather than limiting in all aspects.

For example, some components, each of which has been described as being a single form, can be embodied in the distributed form, whereas some components, which have been described as being distributed, can be embodied in the combined form.

The scope of the present invention is not defined by the detailed description as set forth above but by the accompanying claims of the invention. It should also be understood that all changes or modifications derived from the definitions and scopes of the claims and their equivalents fall within the scope of the invention.

The invention claimed is:

1. A method for processing data that prevents deadlock in a synchronous messaging scheme, comprising:
   (a) transmitting a synchronous read message for requesting information on a state of a target actor required for processing data;
   (b) until a response to the synchronous read message is received, receiving and processing only a synchronous read message from which information on a state of an actor is read;
   (c) when the response to the synchronous read message is received, processing relevant data using the information on the state of the target actor;
   (d) determining whether or not the target actor the information on the state of which is required is present in a same memory space;
   (e) when the target actor is present in the same memory space, reading the information on the state directly from the target actor via a direct-call scheme; and
   (f) processing relevant data using the information on the state which is read directly,
      wherein the synchronous read message that is processed in the step (b) is received from a message queue, wherein the message queue stores an event message, with which the state of the actor is changed, or the synchronous read message, and
      wherein the synchronous read message that is processed in the step (b) is received directly from the actor.

2. The method of claim 1, wherein transmitting and receiving the synchronous read message are performed via a thread of an operating system (OS).

3. The method of claim 1, wherein the target actor is present in a separate host.

4. The method of claim 1, wherein the target actor is present in a same host.

5. A system for processing data that prevents deadlock in a synchronous messaging scheme, comprising:
   a data processor, which processes data using information on a state of a target actor;
   a read message generator, which generates a synchronous read message for requesting the information on the state of the target actor; and
   a received message processor, which processes only a synchronous read message for reading information on a state of an actor, among messages that are received until a response to the synchronous read message that is transmitted to the target actor is received,
   wherein the data processor processes data by reading the information on the state of the target actor that is present in a same memory space via a direct-call scheme;
   wherein the synchronous read message received by the received message processor is received directly from the actor,
   wherein the synchronous read message received by the received message processor is received from a message queue,
   wherein the message queue stores an event message, with which the state of the actor is changed, or the synchronous read message, and
   wherein the synchronous read message that is processed is received directly from the actor.

* * * * *